United States Patent [19]

Furukawa et al.

[11] Patent Number: 4,582,812
[45] Date of Patent: Apr. 15, 1986

[54] ALUMINUM OXIDE SUBSTRATE MATERIAL FOR MAGNETIC HEAD AND METHOD FOR PRODUCING THE SAME

[75] Inventors: Mitsuhiko Furukawa; Michito Miyahara; Takashi Kitahira; Kiyohito Misumi; Masaharu Shiroyama, all of Fukuoka; Toshiaki Wada, Osaka, all of Japan

[73] Assignees: Nippon Tungsten Co., Ltd., Fukuoka; Sumitomo Special Metals Co., Ltd., Osaka, both of Japan

[21] Appl. No.: 639,216

[22] Filed: Aug. 9, 1984

Related U.S. Application Data

[63] Continuation of Ser. No. 575,475, Jan. 30, 1984, abandoned, which is a continuation of Ser. No. 327,371, Dec. 4, 1981, abandoned.

[30] Foreign Application Priority Data

Jan. 9, 1981 [JP] Japan .................................. 56-2298
Jan. 9, 1981 [JP] Japan .................................. 56-2297

[51] Int. Cl.$^4$ ..................... C04B 35/56; C04B 35/10; G11B 5/187
[52] U.S. Cl. .................................... 501/87; 360/103; 360/122
[58] Field of Search ................. 501/87; 360/102, 103, 360/110, 113, 122

[56] References Cited

U.S. PATENT DOCUMENTS 4,130,847 12/1978 Head et al. .......................... 360/122
4,251,841 2/1981 Jacobs ................................. 360/122
4,356,272 10/1982 Kanemitsu et al. ................... 501/87

Primary Examiner—Mark L. Bell
Attorney, Agent, or Firm—Burns, Doane, Swecker and Mathis

[57] ABSTRACT

Aluminum oxide substrate material for magnetic heads having improved toughness consisting essentially of: (1) 100 parts by weight, consisting of aluminum oxide and 30 to 50 parts by weight of $(TiC+TiO_2)$, and that provided $TiO_2/(TiC+TiO_2)\times 100 = 5$ to 15, (2) 0.5 to 5 parts by weight of addition of free cutting comprising at least one from the group of MgO, NiO, $Cr_2O_3$ and $ZrO_2$, and (3) 0.05 to 2 parts by weight of $Y_2O_3$.

The method of hot-forming aluminum oxide substrate material for magnetic head having improved sinterability consisting of (a) preparing a green compact by molding a raw material mixture which contains: (1) 100 parts by weight, consisting of aluminum oxide and 30 to 50 percent by weight of $(TiC+TiO_2)$, and that provided $TiO_2/(TiC+TiO_2)\times 100 = 5$ to 15, (2) 0.5 to 5 parts by weight of machinability agents comprising at least one from the group of MgO, NiO, $Cr_2O_3$ and $ZrO_2$, and (3) 0.05 to 2 parts by weight of $Y_2O_3$ (b) optionally presintering said green compacts; and effecting sintering.

11 Claims, 22 Drawing Figures

ALUMINUM OXIDE SUBSTRATE MATERIAL FOR MAGNETIC HEAD AND METHOD FOR PRODUCING THE SAME

RELATED APPLICATIONS

This application is a continuation of application Ser. No. 575,475, filed Jan. 30, 1984, which is a continuation of Ser. No. 327,371, filed Dec. 4, 1981, both now abandoned.

BACKGROUND OF THE INVENTION

This invention relates to an aluminum oxide substrate material for a magnetic head and to a method for producing the same. The product is improved for high density recording by using a thin film magnetic head. Magnetic head material for high density recording should not have a lower magnetic permeability in the higher frequency range, and it is hard to make a narrow track in the usual soft ferrite material. For the substrate material for thin film magnetic heads, the complete absence of minute pores on the super precise mirror-like finished surface, and easy machinability are required. Generally, a ceramic substrate is recommended for a thin film magnetic head. The ceramic powder has to be sintered and formed until its theoretical density is substantially reached, and strong binding forces and fine structure in the ceramic crystal must be present to obtain a super precise mirror-finished base sheet without minute pores. On the other hand, the machinability of such ceramic sintered bodies is very difficult.

Heretofore, hot-pressing methods and hot isostatic pressing methods (hereinafter called the HIP method) have been proposed as effective sintering methods for producing such ceramic base sheet. In the hot pressing method, $Al_2O_3$-TiC raw material powder is hot pressed at 1600° C. to 1800° C. to produce the sintered body. In the process of sintering, less than 0.5 percent by weight of one or more components selected from the group consisting of MgO, NiO and $Cr_2O_3$ is/are usually added to the green compact to inhibit the grain growth of the sintered body during the sintering, because the sintering must be conducted at a relatively high temperature, but it is still not sufficient to obtain a sintered body having a theoretical density and there are still problems with machinability.

Referring now to the HIP method, which has come to the stage of practical application, the green compact must be formed, as a preliminary treatment, into a presintered compact so that the compact has a density of more than 94% of the theoretical density. In the production of such $Al_2O_3$-TiC ceramic base sheet to which the present invention is directed, less than 1.0 percent by weight of one or more components selected from the group consisting of MgO, NiO and $Cr_2O_3$ is/are usually added to the green compact to inhibit the grain growth of the sintered body.

However, such addition of the grain growth inhibitor is still not sufficient to obtain a presintered body having the aforementioned intended relative density, unless the presintering is effected at an elevated temperature of 1850° C. to 1950° C.

Then, however, since an $Al_2O_3$-TiC ceramic base sheet is exposed to the high temperature during the presintering operation, $Al_2O_3$ grains and TiC grains grow in spite of the addition of the above-mentioned grain growth inhibitor. In the super precise mirror-finish base sheet, such grains often result in minute pores and chipping-off of the the edge when the sheet is processed mechanically to provide a track.

Furthermore, since the above production process necessitates presintering at the high temperature, it gives rise to an energy saving problem.

DETAILED DESCRIPTION OF THE PREFERRED EMBODIMENTS

The following embodiments relate to a substrate material for magnetic heads and the method for producing the same wherein the subject matter of the invention lies in a sintered body consisting essentially of;
(a) 100 parts by weight, consisting of aluminum oxide and 30 to 50 parts by weight of (TiC+$TiO_2$), provided that TiC/(TiC+$TiO_2$)×100=5 to 15%;
(b) 0.5 to 5 parts by weight of machinability agents comprising at least one from the group consisting of MgO, NiO, $Cr_2O_3$ and $ZrO_2$; and
(c) 0.05 to 2 parts by weight of $Y_2O_3$.

The sintered body of this embodiment and the method for producing the same are further explained by the following experiments.

Figure 1:
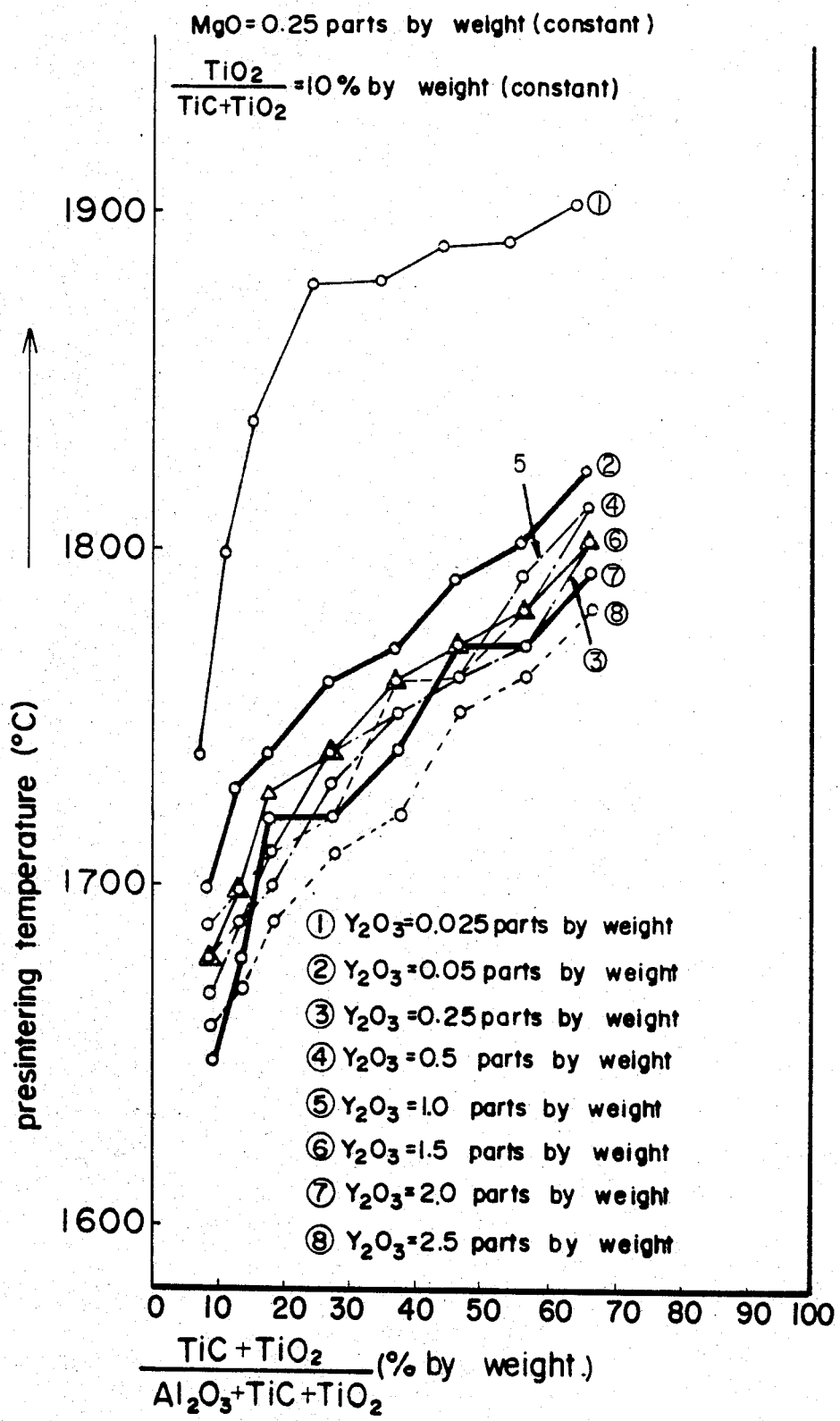
FIGS. 1 to 11 are graphs and electroscanning photomicrographs showing the results of the first experiment I.
Figure 2:
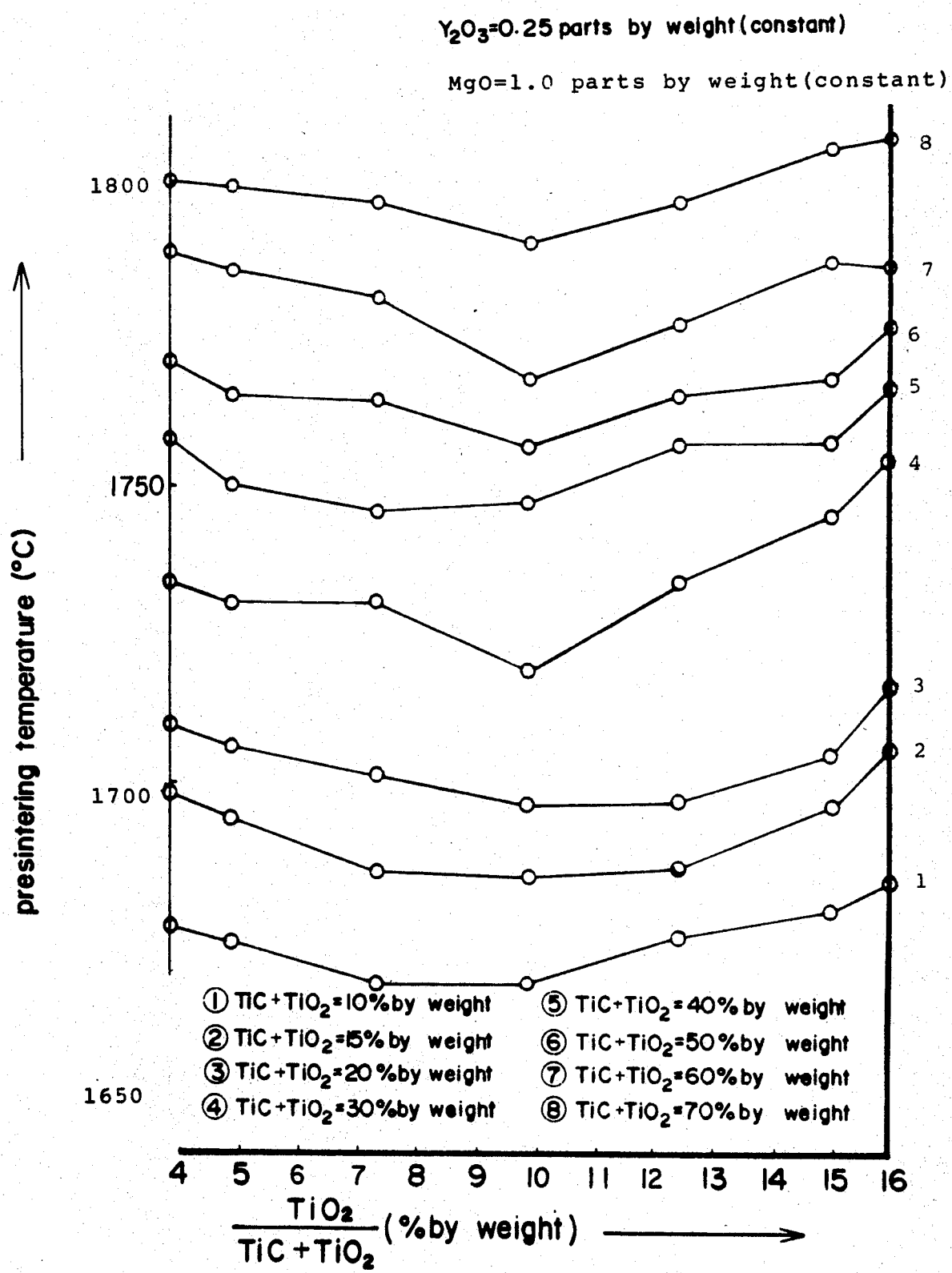

EXPERIMENT I (a) Experimental Procedure and Results

α-$Al_2O_3$ having a purity of 99.9% and a mean particle size of 0.6 μm and TiC, $Y_2O_3$, $TiO_2$, each oxide of Ni, Cr, Mg, Zr, respectively having a purity of 99% and a mean particle size of 1 μm, were mixed in various mixing ratios by wet ball milling for 20 hours. Subsequently, water-soluble wax was added to the mixture. The mixture was granulated and molded at a pressure of 1.3 ton/$cm^2$ so that a green compact having a square side of 50 mm and a thickness of 5 mm after sintering was formed. The molding pressure was more than 0.5 ton/$cm^2$ since it was experimentally proven that such pressure is necessary in the molding operation. The green compact which was formed in the above manner at room temperature was presintered in a furnace with an argon gas atmosphere so that the presintered body would have a density of more than 94% of the theoretical density after holding the compact for 1 hour at a temperature falling in the range of from 1650° C. to 1950° C. The relationship between the above holding temperature and the mixing ratio of the various compositions is shown in FIG. 1. FIG. 2 shows the variations of presintered temperature when the $TiO_2$/(TiC+

$TiO_2$) value was varied while the $Y_2O_3$ content and MgO content were held constant at 0.25 and 1.0 part by weight, respectively. The sintered compact prepared in the above manner and having a density ranging from 94% to 95% of theoretical density was placed within a HIP furnace which includes a high pressure vessel containing a molybdenum heating element, and then it was subjected to a HIP treatment for an hour at a temperature of 1400° C., under a high pressure argon gas atmosphere of 1000 kg/cm$^2$, thus producing the final sintered body.

Figure 4:
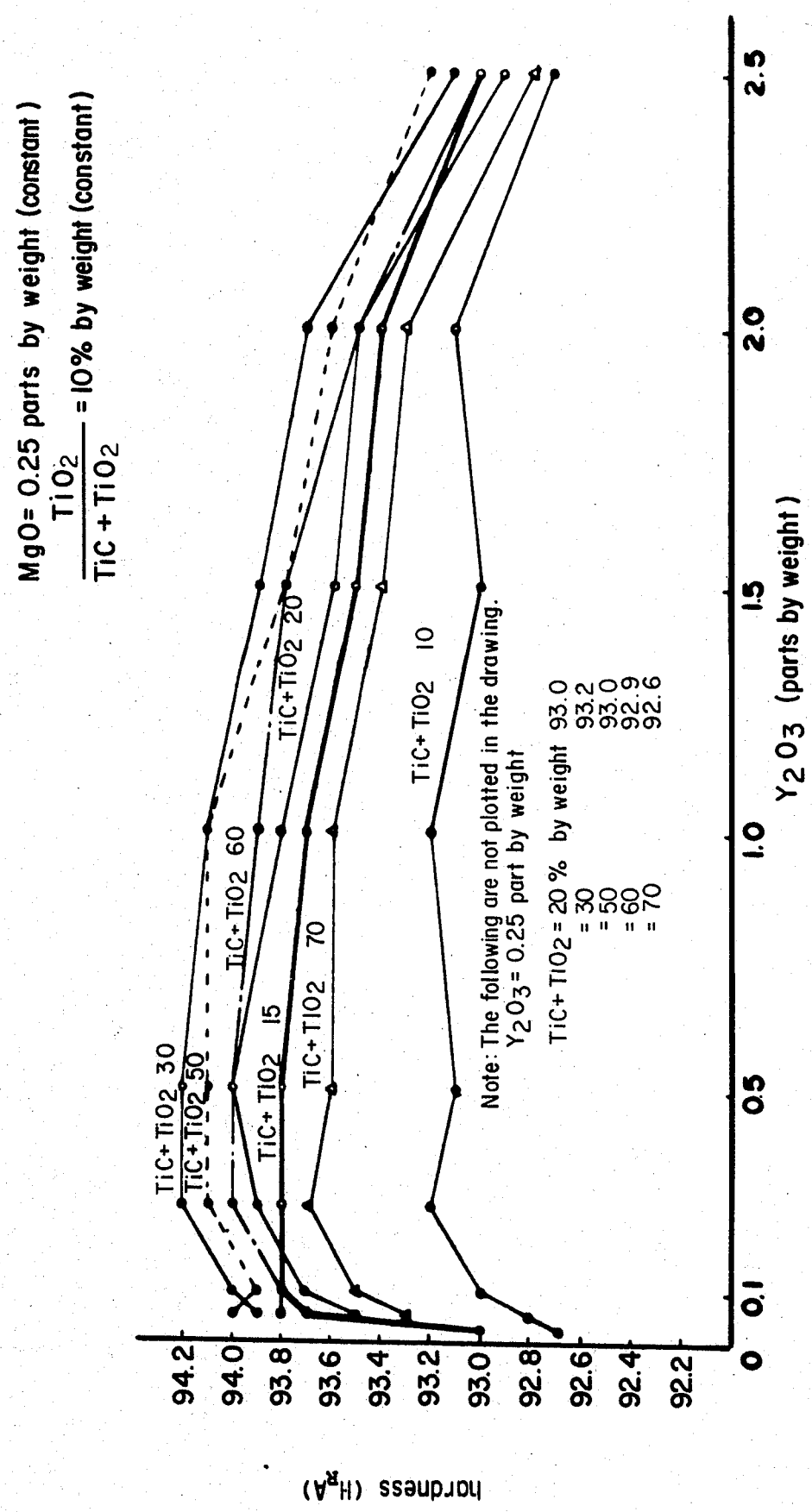
Figure 5:
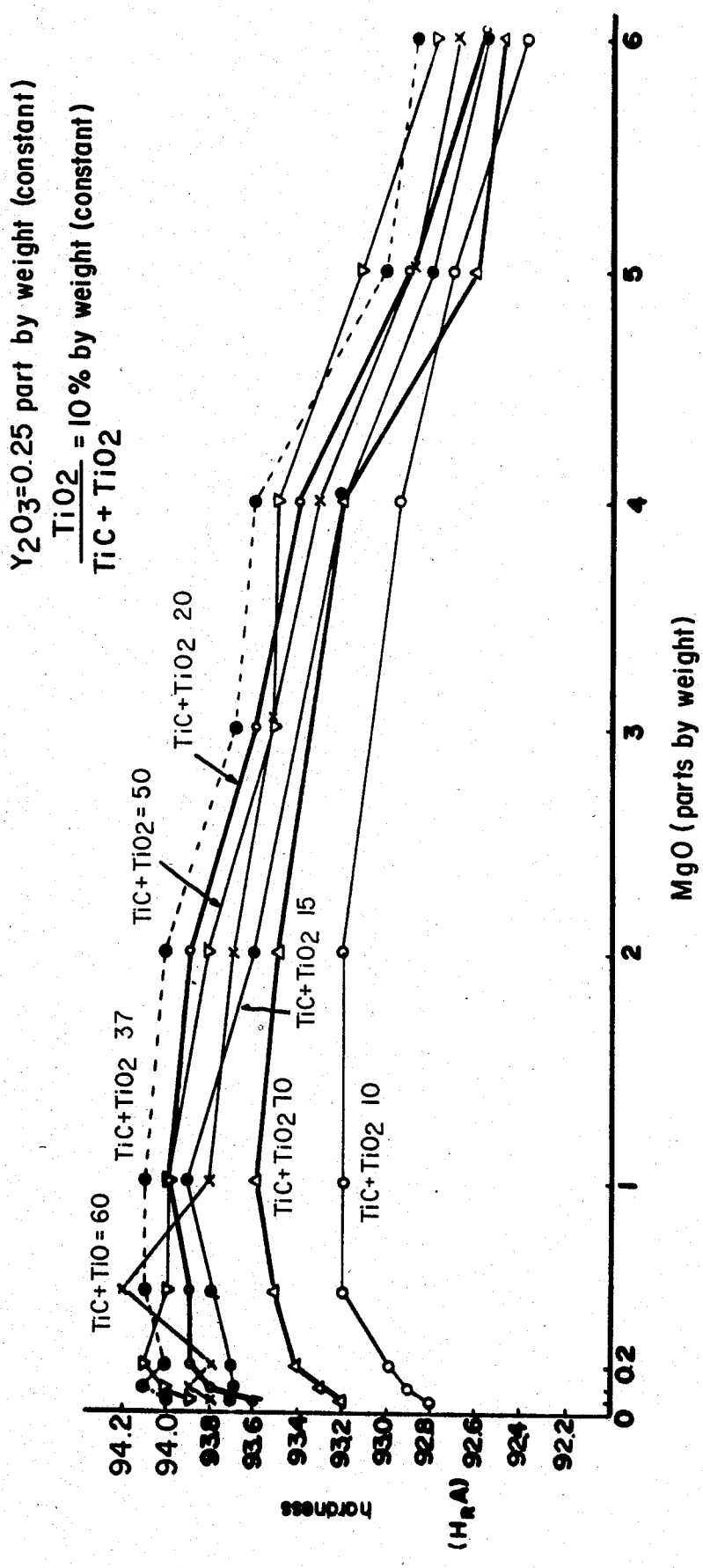
Figure 6:
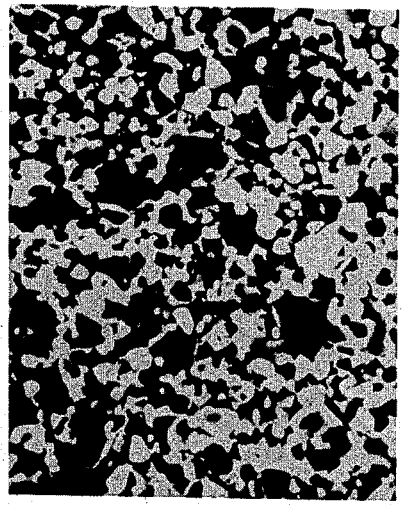

Subsequently, the sintered body was shaped by a diamond grinder and the hardness (Rockwell A scale) of the finished sintered body was measured. The results of the measurements are shown in FIG. 4 and FIG. 5. The electron photomicrograph of the final sintered body after HIP treatment is shown in FIG. 6. The test piece of FIG. 6 is the sintered body which consists of 100 parts by weight of 63%$Al_2O_3$-33.3%TiC-3.7%$TiO_2$, 0.25 part by weight of $Y_2O_3$, and 1 part by weight of machinability agent MgO.

Figure 7:
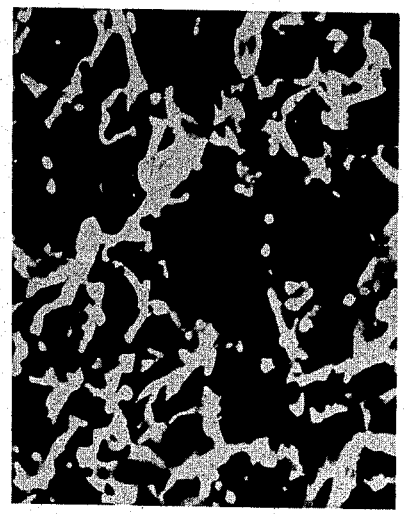

Furthermore, for comparison purposes, the electron photomicrograph of a sintered body which was produced by HIP treatment after presintering the 63%$Al_2O_3$-37TiC composition (no $Y_2O_3$ included) so as to produce a presintered body having a density of more than 94% of the theoretical density is shown in FIG. 7. Furthermore, presintered bodies having a density of 94% to 95% of the theoretical density and prepared from green compacts of various composition ratio were placed within the HIP furnace and were sintered under a pressurized argon gas atmosphere at 1400° C. for 1 hour and at 1000 kg/cm$^2$ thus producing final sintered bodies having a density of more than 99% of the theoretical display. Such final sintered bodies were shaped to 50×50×4.5 mm. Such shaped or processed bodies were used in tests to evaluate grindability. The conditions of grinding were as follows.

Figure 8:
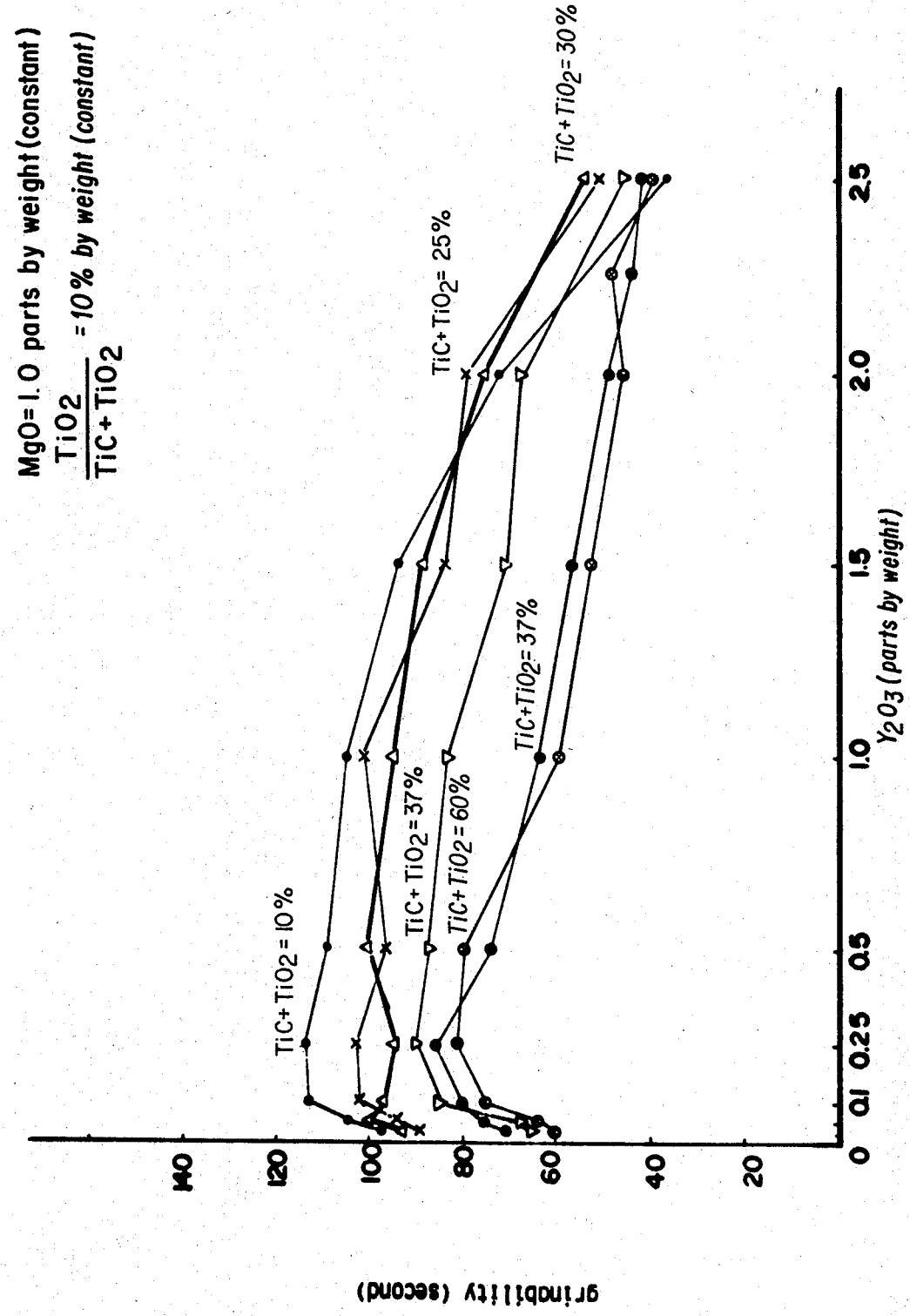

The various test pieces were fixed in place by a jig, and loaded with a 1 kg weight through a pulley, and the time required to cut-off 50 mm by resinoid-bonded diamond wheels was measured. The results of the cutting tests are shown in FIGS. 8 to 11, and the time required for cutting is the mean value of five cuts. FIG. 8 shows the influence of varying $Y_2O_3$ in a composition of 1 part by weight of MgO, with $TiO_2/(TiC+TiO_2)$ being held constant at 10 percent by weight.

Figure 9:
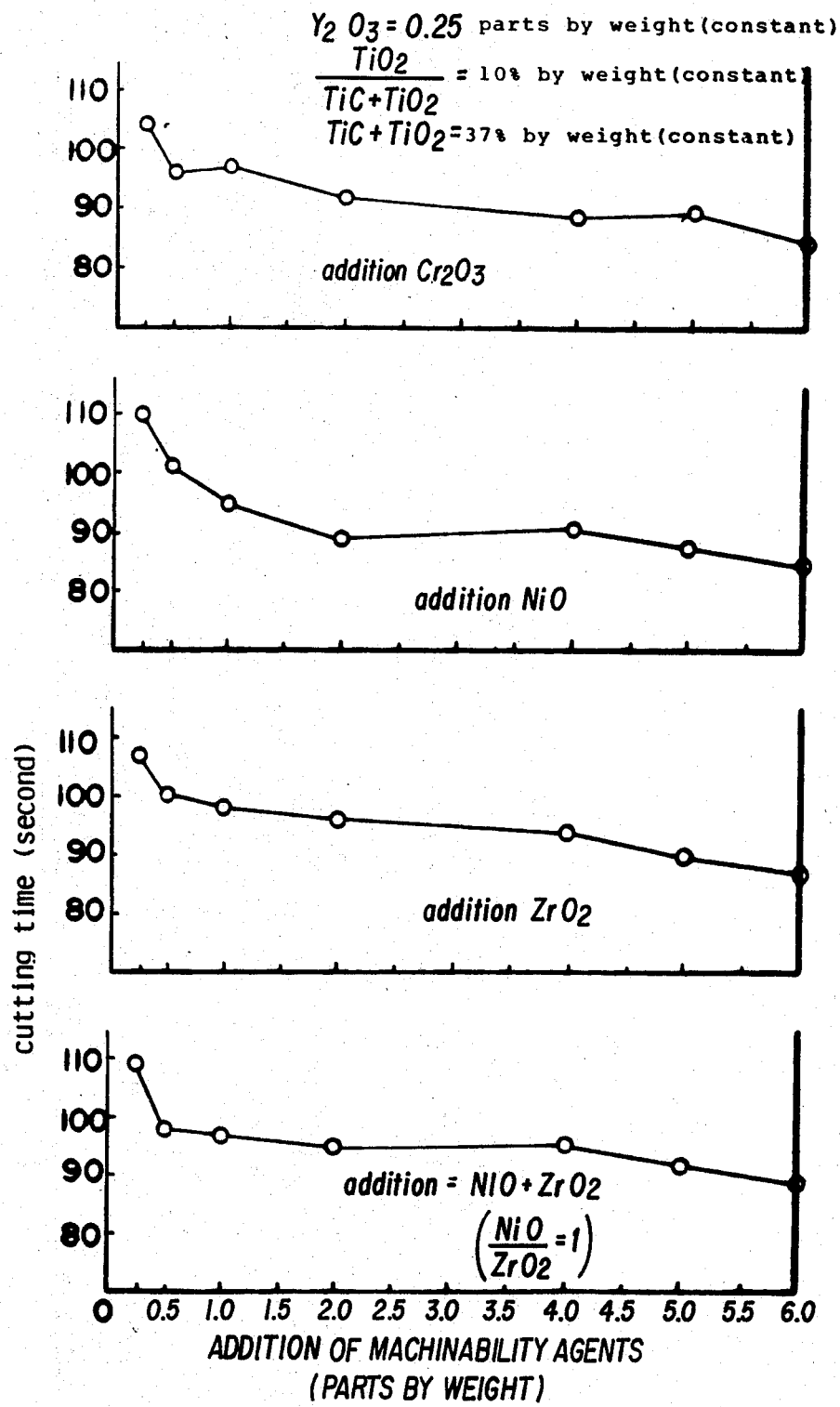
Figure 10:
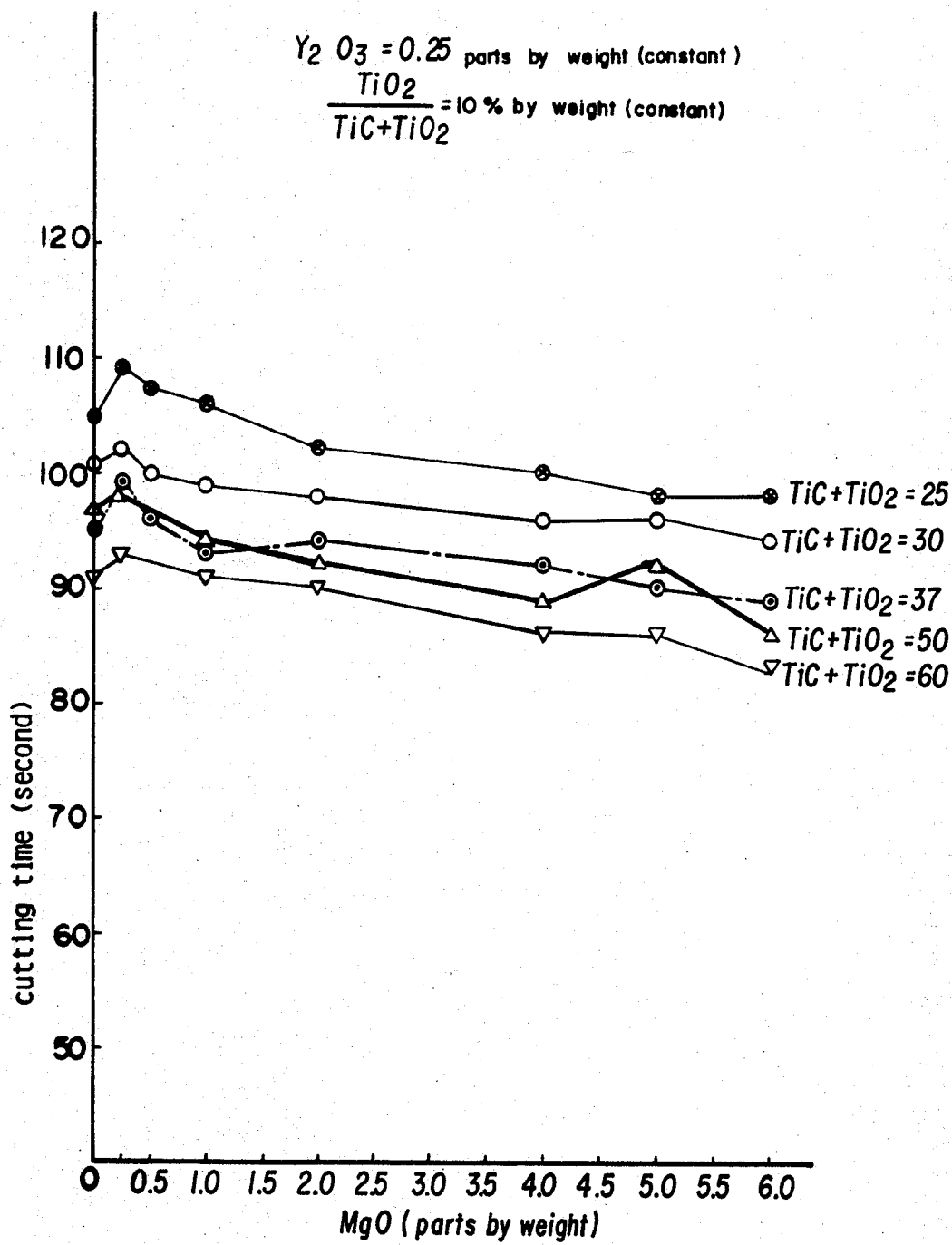

FIG. 9 shows the influence of the addition of NiO, $Cr_2O_3$, $ZrO_2$, and (NiO+$ZrO_2$) as the machinability agents where $Y_2O_3$, $TiO_2/(TiC+TiO_2)$ and (TiC+$TiO_2$) were held constant at 0.25 part by weight, 10 percent by weight, and 37 percent by weight, respectively. In the same manner, FIG. 10 shows the influence of MgO as the machinability agent where $Y_2O_3$ at 0.25 part by weight and $TiO_2/(TiC+TiO_2)$ at 10 percent by weight, were held constant.

Figure 11:
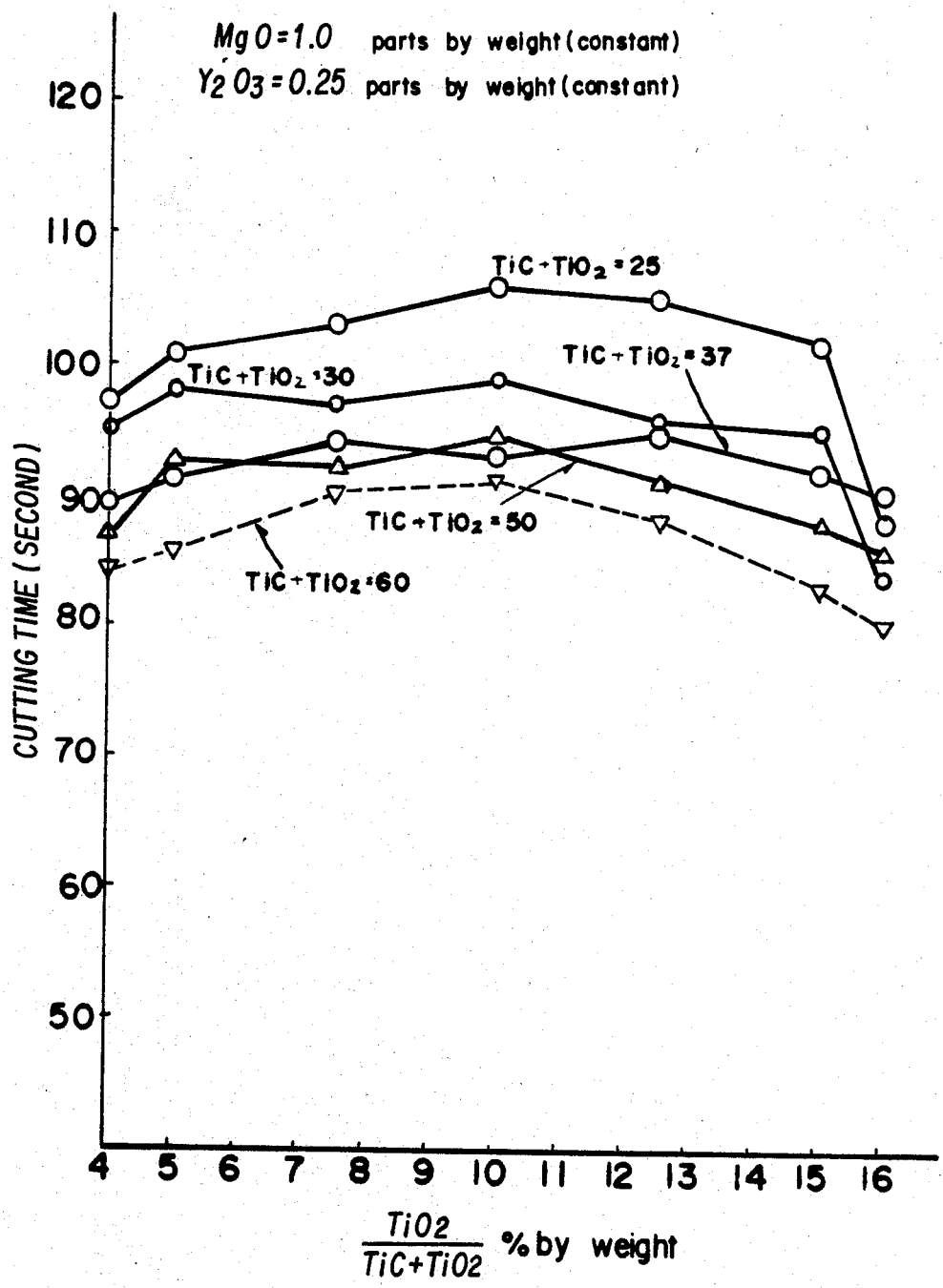

FIG. 11 shows the relationship between the grindability and the variation of $TiO_2/(TiC+TiO_2)$ where MgO was held constant at 1.0 part by weight and $Y_2O_3$ constant at 0.25 part by weight.

(b) Evaluation

FIG. 1 shows the relationship between the temperature and the same raw material compositions for obtaining presintered bodies having the relative theoretical density necessary for applying the HIP method. It was found that compared to the presintered body which contains no $Y_2O_3$, the presintering temperature decreases corresponding to the increase in addition of $Y_2O_3$. However, so long as $Y_2O_3$ accounts for less than 0.05 part by weight, the lowering of the presintering temperature is not sufficient to result in the constituent grains of the presintered body being fine. From FIG. 6 it is observed that the presintered body containing the suitable amount, namely 0.5 part by weight of $Y_2O_3$ has uniform and minute constituent grains and structure.

However, when the amount of $Y_2O_3$ exceeds 2 parts by weight, it is impossible to densify the structure of the resulting presintered body, even when it has a relative theoretical density of 95%, since an increasing number of large spots (i.e., pores) are formed in that structure.

Judging from FIG. 2, the effect of $TiO_2$ upon sintering improvement decreases and the presintering temperature rises when $(TiO_2/(TiC+TiO_2))\times 100$ is less than 5 percent by weight. When exceeding 15 percent by weight, it is also impossible to have high density, and uniform and minute constituent grain and structure, and the presintering temperature rises. The amount of up to about 15% by weight is significant due to the reaction with other constituents and free carbon in TiC, but when the value of $TiO_2/(TiC+TiO_2)$ becomes larger, TiC will oxidize and show coarsened TiC grains.

Figure 3:
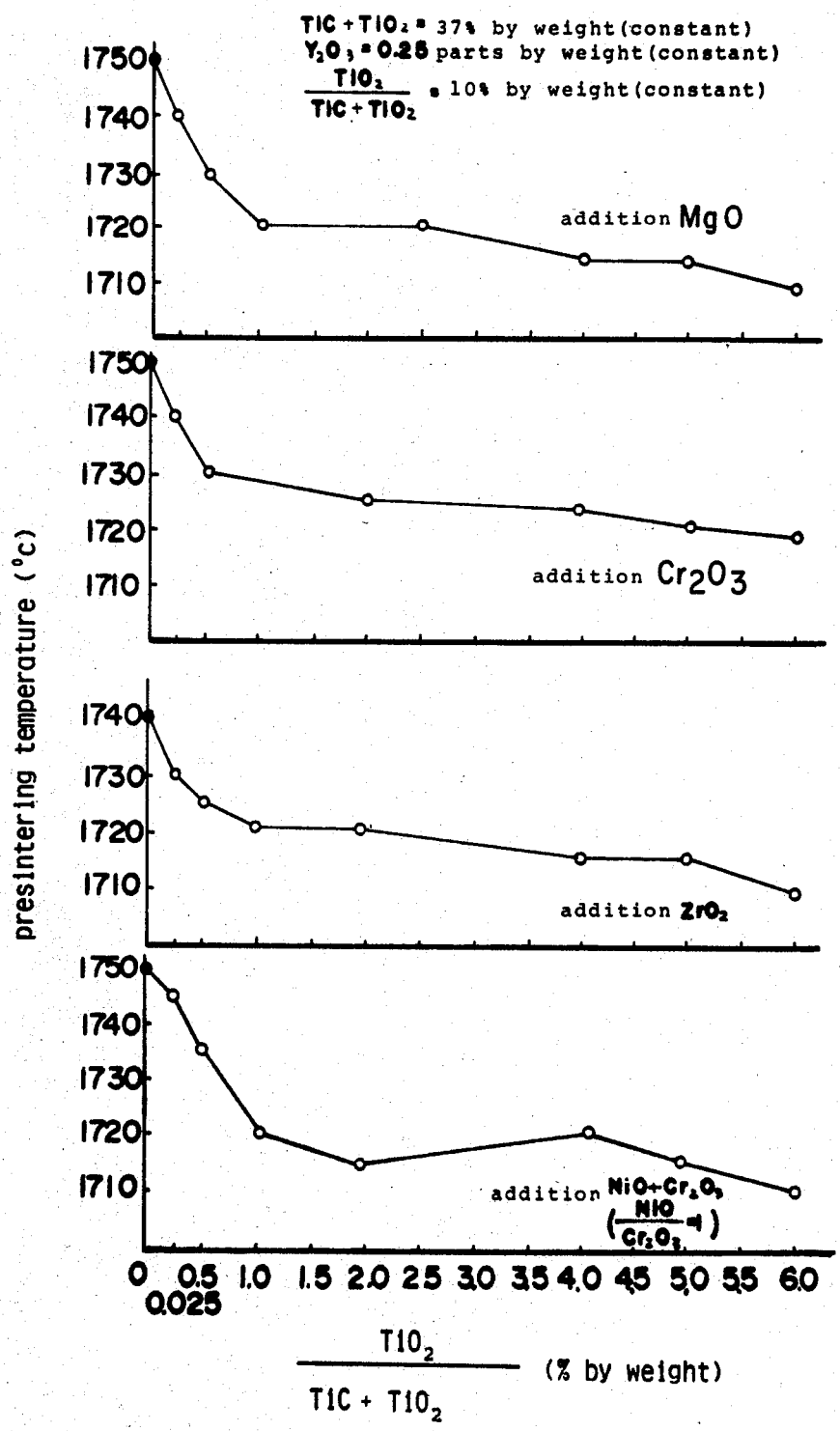

In FIG. 3, various additions were made of machinability agents which are generally called grain growth inhibitor and sintering aids, and it is seen that the effect of sinterability improves remarkably in the range of 0.5 parts by weight or more. Obviously, 6 percent by weight of addition of the machinability agents increases the lowering in the sintering temperature, but when it exceeds 5 parts by weight, the phenomena of anomalous growth in the crystal of the presintered bodies is found. In materials which require wear-resistance, such as the ceramic cutting tools, less than 0.5 part by weight of addition is usual, but this experiment examined larger amounts thereof.

FIG. 4 shows the relationship between $Y_2O_3$ amount and hardness. $Y_2O_3$ mixing quantities have positive effects from 0.05 part by weight to 2 parts by weight, and have adverse effects in more than 2 parts by weight. The hardness of the sintered body generally shows a high density when the size of grain is small and uniform and fine constituent grains and structure exist. The substrate material for a magnetic head requires the same properties and as another characteristic, it requires good machinability. When $Y_2O_3$ is less that 0.05 part by weight, the effect of sintering aids does not show the fine result. Therefore it is difficult to provide uniform and minute constituent grains or structure because of the necessity of presintered at higher temperatures.

Now referring to the relationship between mixing quantities of MgO and hardness, the grains of a sintered body had a tendency to grow when MgO was less than 0.1 part by weight and to be normal grains when it was from 0.1 part by weight to 5 parts by weight. The result of this experiment shows a hardness of over 93.0 ($H_RA$). Nevertheless, the hardness of the sintered body reduced remarkably when mixing quantities exceeded 5 parts by weight, and also demonstrated abnormal grain growth.

To determine the relationship between the machinability agents and grindability, a sintered body of 50×50×4.5 mm is held under constant weight and the time required for resinoid-bonded diamond wheels of 1.00 mm thickness to cut off 50 mm is determined. In FIGS. 8 to 11 the results are the average of 5 cuttings. FIG. 9 and FIG. 10 show that grindability has been remarkably improved by adding the machinability agents at 0.5 part or more by weight, and also further improved from 1 part by weight to 6 parts by weight.

As to the slider of the magnetic head, the sintered body requires uniform and fine constituent grains or structure to provide precision machinability and wear resistance. However, addition of more than 5 parts by weight of machinability agents is objectionable because it gives rise to abnormal grain growth and losing high-density. Concretely, FIG. 10 shows that the grindability becomes worse in a range of less than 0.5 part by weight (prolonged cutting time), but it was improved at more than 0.5 part by weight. Exceeding 5 parts by weight, the grindability is still more improved, but it is objectionable for losing high-density and increasing abnormal grain growth. Additionally, the grindability at 25 percent by weight of (TiC+TiO$_2$) shows a worse effect due to an increased amount of Al$_2$O$_3$ and it is objectionable that a magnetic slider material has a high level of the degree of working. Over 60 percent of weight of (TiC+TiO$_2$), the grindability was still more improved, but it is objectionable because presintering must be conducted under the condition of high temperature. These above results hold true for other machinability agents.

EXPERIMENT II

(a) Experimental Procedure and Results

α-Al$_2$O$_3$ having a purity of 99.9% and a mean particle size of 0.6 μm and TiC, TiO$_2$, Y$_2$O$_3$ and MgO having a purity of 99.9% and a mean particle size of 1 μm were mixed in various mixing ratios by wet ball milling for 20 hours. The mixture was then sufficiently dried to prepare the sintering raw material. The raw material was packed in a graphite crucible having a size of 50×50 mm square the 60 mm high. The crucible was inserted in a high frequency coil in an inactive atmosphere and the pressure within the crucible was raised up to 200 kg/cm$^2$ at various temperatures which fall in a range from 1350° C. to 1850° C. Such a condition was maintained for 60 minutes.

Figure 12:
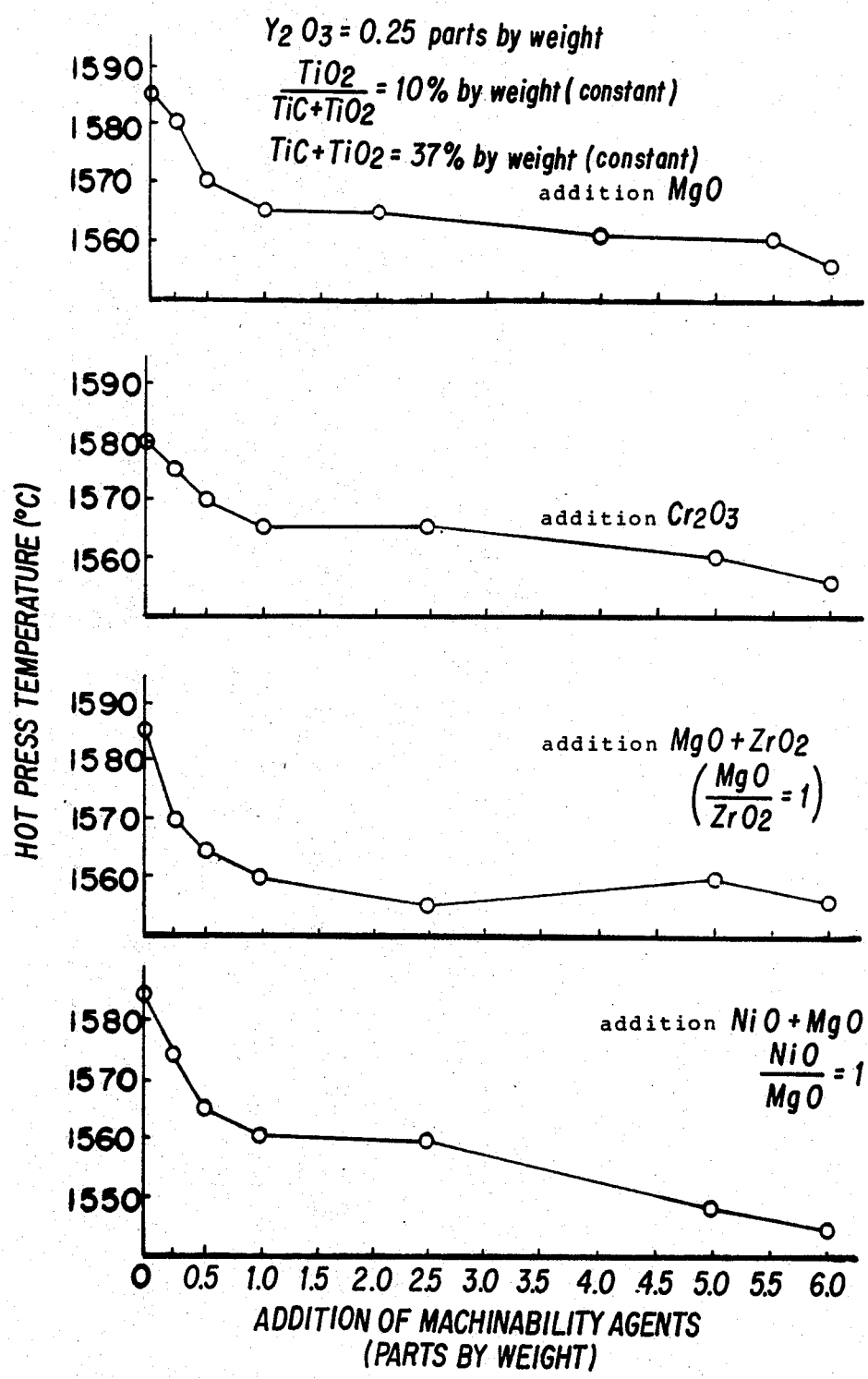
FIGS. 12 to 18 are graphs and electroscanning photomicrographs showing the results of the second experiment II.

Subsequently, the pressure was released from the crucible and the crucible was gradually cooled, producing a sintered body having a size of 50×50×5.5 mm cube. Table 1 shows the hot press temperature for sintering the compact so that the sintered body would have a density of at least 98.5% of the theoretical density, when the pressure was 200 kg/cm$^2$, the holding time was 60 minutes, and TiO$_2$/(TiC+TiO$_2$)×100 was 10% by weight. The minimum temperatures which can provide a density of at least 99.5% of the theoretical density, when the pressure was 200 kg/cm$^2$, the holding time was 60 minutes, and the composition was comprised of 100 parts by weight of (70%Al$_2$O$_3$-27%TiC-3%TiO$_2$), 0.25 part by weight of Y$_2$O$_3$ (constant) and machinability agents (additives), are shown in FIG. 12.

TABLE 1

| Y$_2$O$_3$ (parts by weight) | $\dfrac{TiC + TiO_2}{Al_2O_3 + TiC + TiO_2} \times 100$ wt % | | | | | | |
|---|---|---|---|---|---|---|---|
| | 10 | 15 | 20 | 30 | 40 | 50 | 60 | 70 |
| 0.025 | 1470 | 1520 | 1570 | 1730 | 1780 | 1790 | 1800 | 1820 |
| 0.050 | 1410 | 1430 | 1440 | 1570 | 1630 | 1670 | 1730 | 1740 |
| 0.250 | 1410 | 1420 | 1430 | 1570 | 1620 | 1660 | 1730 | 1740 |
| 0.500 | 1400 | 1420 | 1420 | 1560 | 1620 | 1660 | 1720 | 1730 |
| 1.000 | 1400 | 1420 | 1420 | 1550 | 1620 | 1650 | 1720 | 1730 |
| 1.500 | 1400 | 1410 | 1420 | 1550 | 1610 | 1650 | 1710 | 1730 |
| 2.000 | 1390 | 1410 | 1410 | 1540 | 1610 | 1640 | 1710 | 1730 |

TABLE 1-continued

| Y$_2$O$_3$ (parts by weight) | $\dfrac{TiC + TiO_2}{Al_2O_3 + TiC + TiO_2} \times 100$ wt % | | | | | | |
|---|---|---|---|---|---|---|---|
| | 10 | 15 | 20 | 30 | 40 | 50 | 60 | 70 |
| 2.500 | 1390 | 1410 | 1410 | 1540 | 1620 | 1640 | 1700 | 1720 |

Figure 13:
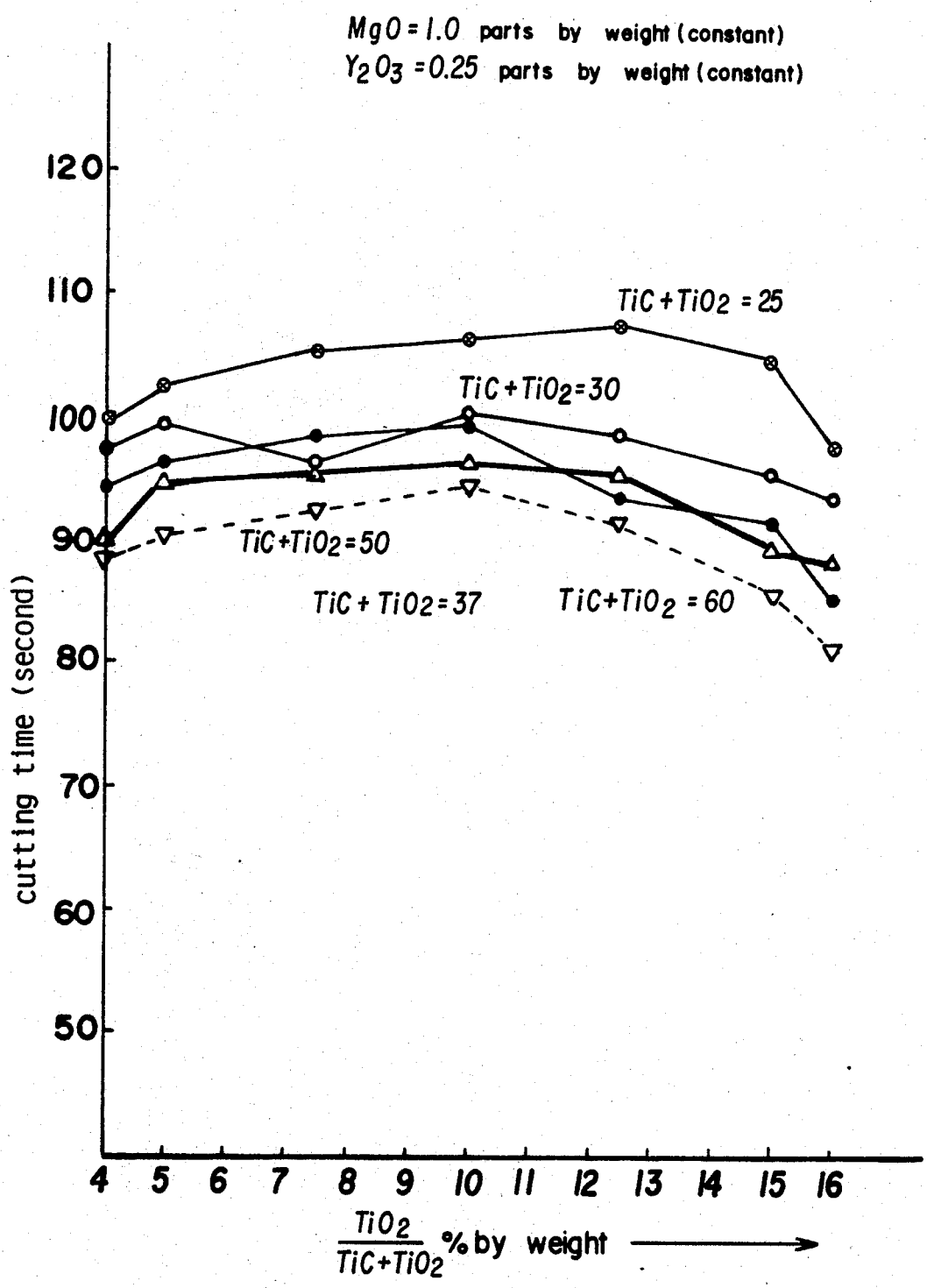

FIG. 13 shows the grindability of a hot press sintered body having a composition of Al$_2$O$_3$ and (TiC+TiO$_2$) admixed with 0.25 part by weight of Y$_2$O$_3$ and 1.0 part by weight of MgO as the machinability agent, where (TiC+TiO$_2$) was varied from 25 to 60 percent by weight and TiO$_2$/(TiC+TiO$_2$) was varied.

Figure 14:
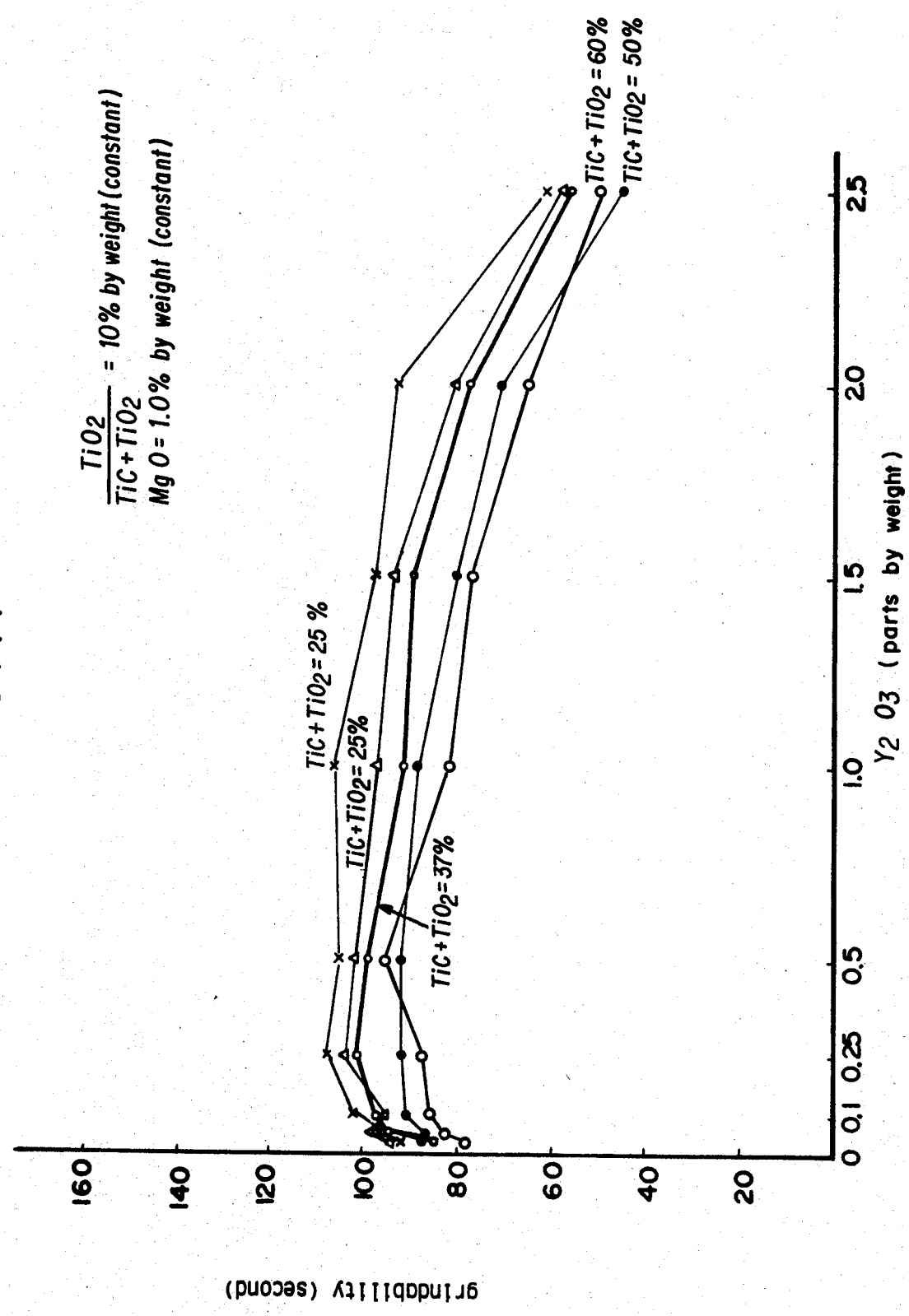

In the same manner, FIG. 14 shows the grindability when TiO$_2$/(TiC+TiO$_2$)×100 was held constant at 10 percent by weight, MgO was held constant at 1.0 part by weight, and Y$_2$O$_3$ was varied.

Figure 15:
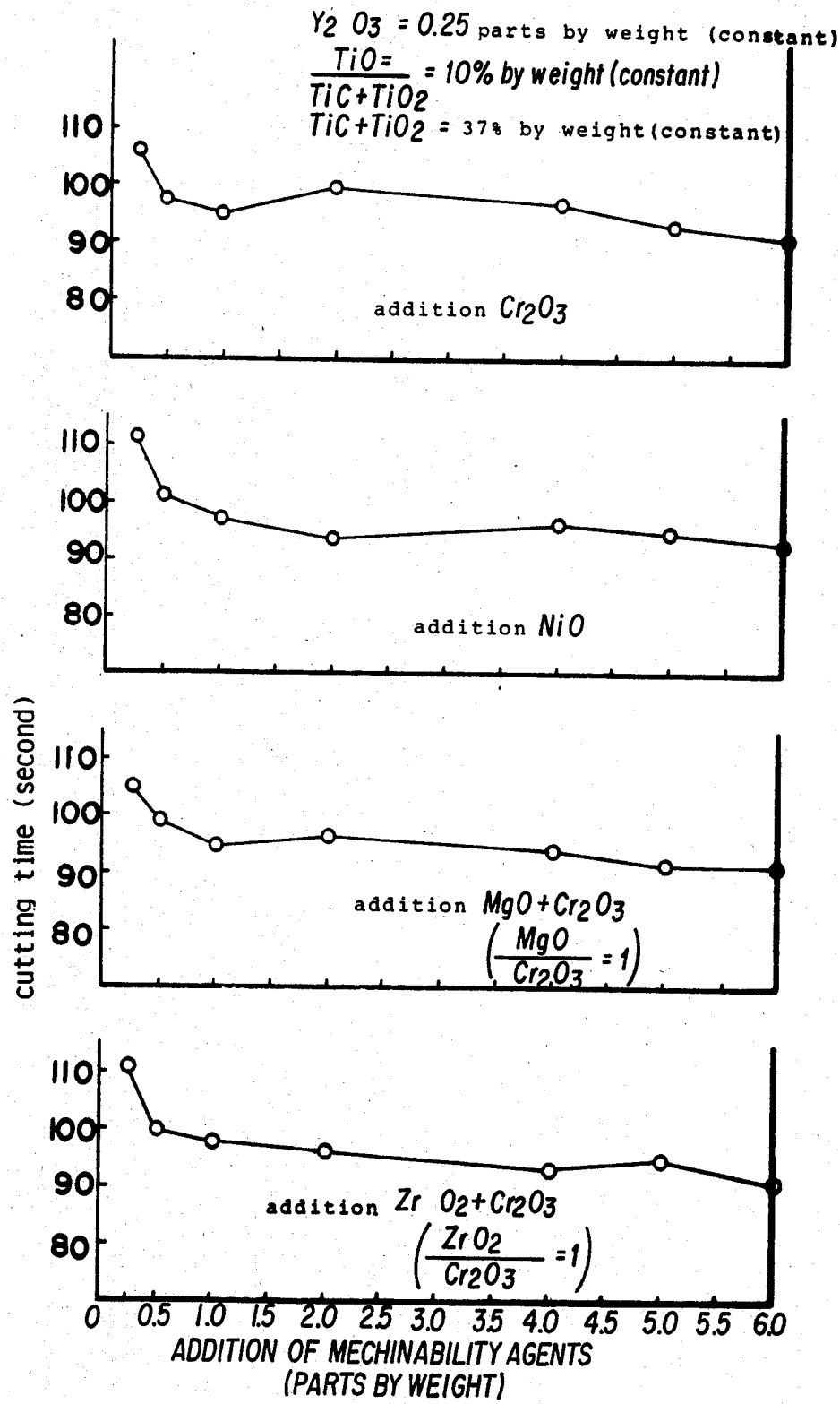

Furthermore, FIG. 15 shows the relationship of grindability when TiO$_2$/(TiC+TiO$_2$)×100 was held constant at 10 percent by weight, (TiC+TiO$_2$) was held constant at 37 parts by weight and Y$_2$O$_3$ was held constant at 0.25 part by weight.

Figure 16:
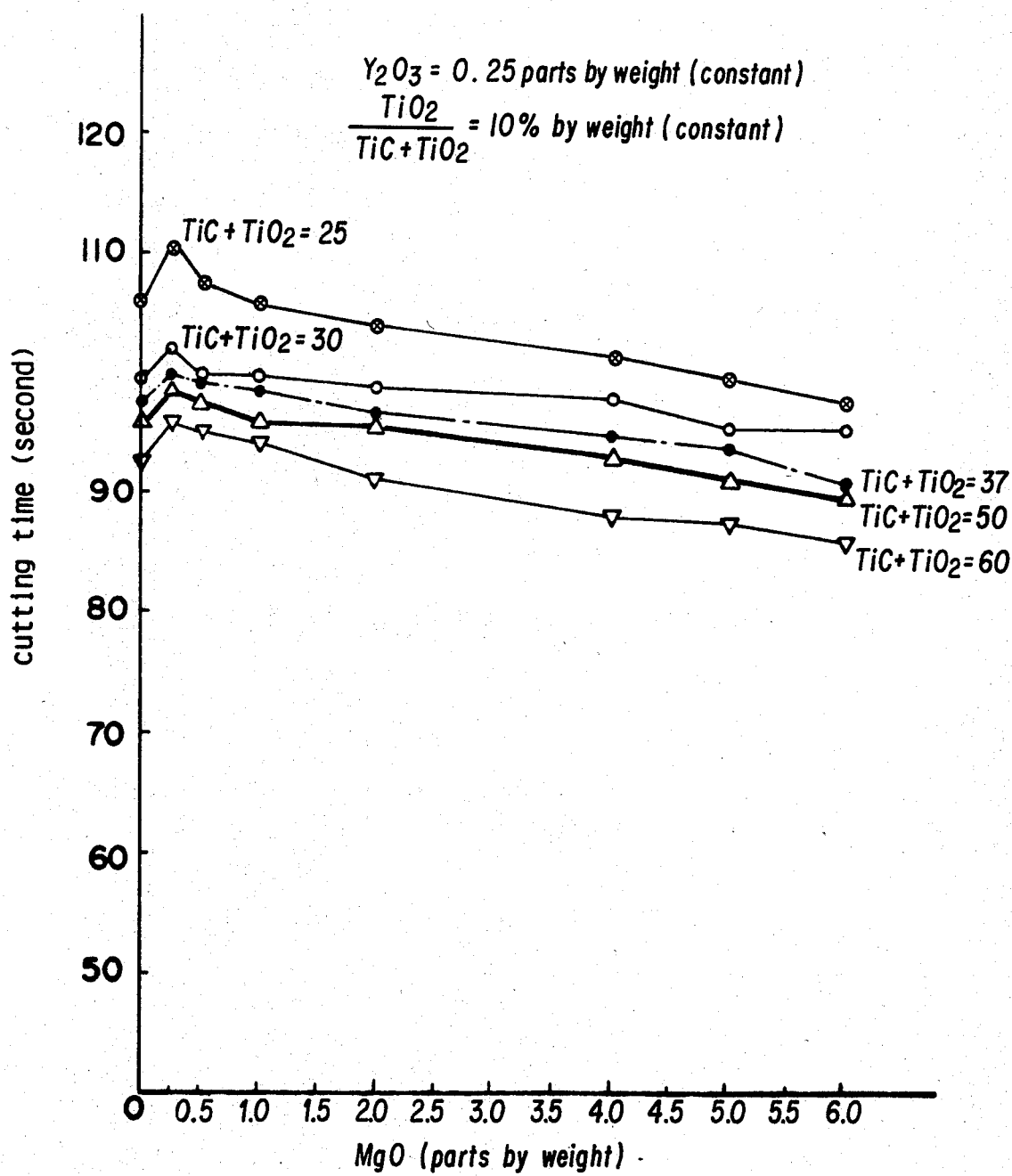

FIG. 16 shows grindability when Y$_2$O$_3$ and TiO$_2$/(TiC+TiO$_2$) were held constant at 0.25 part by weight and 10 percent by weight respectively, and the amount of MgO was varied.

Additionally, grindability tests as already mentioned in Experiment I and, shown in FIGS. 13 to 16 have been made, where test pieces were fixed in place by a jig pulley and loaded with a 1 kg weight through a pulley, and the time required for resinoid-bonded diamond wheels to cut off 50 mm was measured.

Figure 17:
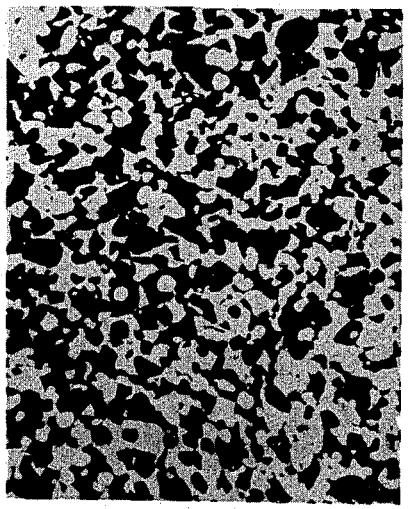
Figure 18:
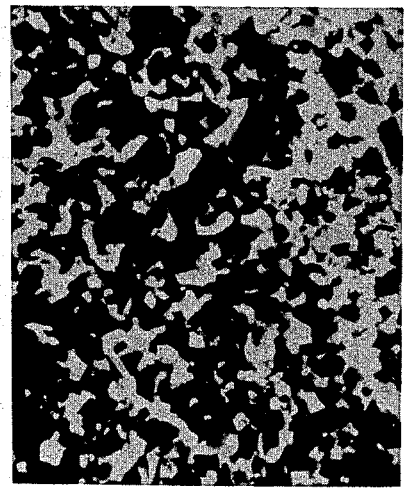

An electroscanning photomicrograph of a test piece of the composition consisting of 100 parts by weight of (63%Al$_2$O$_3$-33.3%TiC-3.7%TiO$_2$), 0.25 part by weight of Y$_2$O$_3$, and B 1 part by weight of machinability agents is shown in FIG. 17. FIG. 18 is an electroscanning photomicrograph of 63%Al$_2$O$_3$-37%TiC (no Y$_2$O$_3$ being included), for comparison with FIG. 17.

(b) Evaluation

Although the influence of the composition or mixture ratio of the raw material composition upon the hot press sintering is approximately the same as that in the HIP method, the following phenomenon is particularly directed to the hot press sintering method. FIG. 12 shows the composition under the condition that Y$_2$O$_3$ was held constant at 0.25 part by weight, (TiC+TiO$_2$) at 37 percent by weight and also TiO$_2$/(TiC+TiO$_2$) was held constant at 10 percent by weight, and machinability agents were varied up to 6 parts by weight. Hot pressing sinterability is shown in FIG. 12 under the above condition with mixing compositions comprising at least one or two from the group of MgO, Cr$_2$O$_3$, ZrO, NiO.

In FIG. 12, hot-pressing temperature is lowered, and low temperature sinterability is improved with increasing amounts from the latter group. FIG. 13 shows the grindability of hot-pressed sintered bodies, where Y$_2$O$_3$ was held constant at 0.25 part by weight, MgO was held constant at 1.0 part by weight, and (TiC+TiO$_2$) is in the range of 25 percent by weight, and also TiO$_2$/(TiC+TiO$_2$) was varied.

FIG. 13 shows that 25 percent by weight of (TiC+TiO$_2$) produces time-consuming cutting time and poor grindability. And 60 percent by weight of (TiC+TiO$_2$) composition has the most excellent grindability, but it is considered to be the result of coarsening and not producing high-density of the structure of the sintered bodies.

Compositions in which $TiO_2/(TiC+TiO_2)$ is less than 5 percent by weight and more than 15 percent by weight have excellent grindability. However these are considered as lacking high-density, and as producing coarse structure in the sintered bodies.

In FIG. 14, the compositions were held constant at 10 percent by weight of $TiO_2/(TiC+TiO_2)\times 100$, constant at 1.0 part by weight of MgO and $Y_2O_3$ was varied. When $(TiC+TiO_2)$ was more than 25 percent by weight, the cutting time was over 100 sec. and this is objectionable in the case of substrate materials for magnetic heads. When $(TiC+TiO_2)$ was more than 30 percent by weight, the grindability was much better. Improvement of grindability by increasing the $TiC+TiO_2$ value is related to decreasing the $Al_2O_3$ value which results in worse grindability, and it is considered that there is a tendency to coarsening of the structure due to the necessity of the hot pressing at high temperature levels with increasing $TiC+TiO_2$ values. And the grindability necessarily shows a good result due to a reduction of toughness.

On the other hand, the grindability improves radically at less than 0.05 part by weight of $Y_2O_3$ and more than 2 parts by weight. It is considered that the hot pressing at high temperature levels results in coarsening of structure at less than 0.05 part by weight, and coarsening pores in the sintered body structure increase radically at more than 2 parts by weight.

Next is the case of the grindability where $TiO_2/(TiC+TiO_2)\times 100$ was held constant at 10 percent by weight, $Y_2O_3$ constant at 0.25 part by weight, and the amount of the machinability agents was varied. Where one or two components were selected from the group consisting of MgO, NiO, $ZrO_2$ and $Cr_2O_3$, the material of 0.25 part by weight had the worst grindability, and the grindability improved radically for more than 0.5 part by weight which is apparent from FIG. 15; similarly, in the case where $Y_2O_3$ was held constant at 0.25 parts by weight, $TiO_2/(TiC+TiO_2)\times 100$ constant at 10% by weight, and MgO was varied. As seen in FIG. 16, the constitution of material which has a $(TiC+TiO_2)$ content of 25% by weight takes over 100 sec. to cut-off and requires high fabricating costs even if MgO is employed in large quantities, and it is thus objectionable as a substrate material for magnetic head.

Although good machinability is achieved at 60 percent by weight of $(TiC+TiO_2)$, it is unsuitable to use in this invention which requires a good lapped surface and precision due to the coarse structure resulting from the hot pressing in high temperature level. Additionally, there is no data included but oxides of Calcium, Iron, and Manganese were confirmed to exhibit the same effects. And also it was confirmed that the grindability is remarkably influenced by the method of producing ceramic raw material powder.

Especially in the case of TiC raw material powder, it was confirmed that fine powder which was prepared in low temperature carbide-forming and ground was more excellent in the grindability of the sintered body than powder prepared in high temperature carbide-forming. Namely, $\alpha$-$Al_2O_3$ having a purity of 99.9% and a mean particle size of 0.6 $\mu$m and TiC having a purity of 99% and a mean particle size of 0.5 $\mu$m was prepared by low temperature carbide-forming, and TiC powder having a purity of 99% and a mean particle size of 0.5 $\mu$m was prepared by high temperature carbide-forming and were mixed in various mixing ratios by wet milling. The mixture was then sufficiently dried to prepare the sintering raw material. The resultant sintered body of $50\times 50\times 4.5$ mm was held under constant weight through a pulley and the time required to cut-off 50 mm by resinoid-bonded diamond wheels was evaluated. The sintered body which was made by using TiC powder prepared in high temperature carbide-forming takes 2.1 times compared with TiC fine powder prepared in low temperature carbide-forming, in the case of 0.25 part by weight of $Y_2O_3$ and 1 part by weight of MgO per 100 parts by weight of ($63wt\%Al_2O_3$-$33.3wt\%TiC$-$3.7wt\%TiO_2$).

Figure 19:
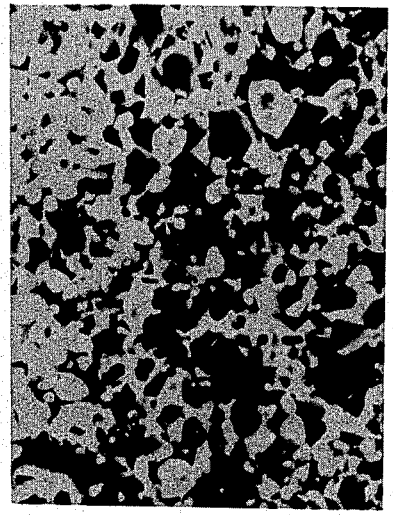
FIG. 19 is an electroscanning photomicrograph showing the crystal structure of a sintered body which was obtained by sintering TiC power produced by high temperature carbide-forming.
Figure 20:
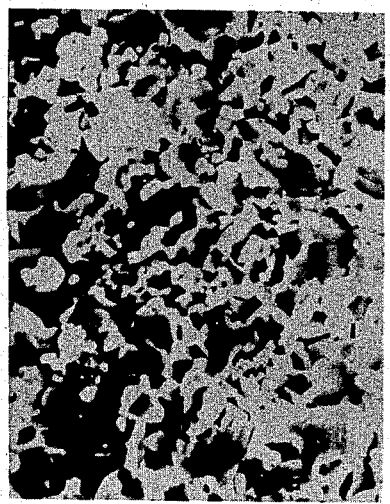
FIG. 20 is an electroscanning photomicrograph showing the crystal structure of a sintered body which was obtained by sintering TiC powder produced by low temperature carbide-forming.

Namely, as one of these causes, it is considered that the shapes of TiC powders are different. TiC fine powder which was prepared in high temperature carbide-forming has a sharp shape, and TiC fine powder which was prepared in low temperature carbide-forming has a slightly rounded shape. It was confirmed that an $Al_2O_3$-TiC ceramic sintered body using this rounded TiC powder has excellent grindability. It is also clear from the photomicrograph of FIG. 19 which was taken on a sample made by using TiC fine powder prepared by high temperature carbide-forming. FIG. 20 is a photomicrograph of the sintered body which was made by using TiC fine powder prepared by low temperature carbide-forming.

EXPERIMENT III (a) Experimental Procedure and Results $\alpha$-$Al_2O_3$ having a purity of 99.9% and a mean particle size of 0.6 $\mu$m, and TiC, $TiO_2$ and $Y_2O_3$ having a purity of 99% and a mean particle size of 1 $\mu$m were mixed in various mixing ratios by wet ball milling for 20 hours. The mixture was then sufficiently dried to prepare the sintering raw material and the addition of machinability agents. The raw material was packed in a graphite crucible having a size of $50\times 50$ square and 60 mm high. The crucible was inserted in a high frequency coil and the pressure within the crucible was raised up to 200 kg/cm$^2$ at various temperatures which fall in a range from 1350° C. to 1850° C. in an inert gas atmosphere. Such a condition was maintained for 60 minutes. Subsequently, the pressure was released from the crucible and crucible was gradually cooled, producing a sintered body having a size of $50\times 50\times 5.5$ mm cube. The hot press temperature for sintering the compact was such that the sintered body had a density of at least more than 99.5% of the theoretical density when $TiO_2/(TiC+TiO_2)\times 100$ was 10% by weight. Referring to the compositional proportion, 0.25 part by weight of $Y_2O_3$, and 0.25, 0.5 and 1.0 part by weight of MgO as well as 2.5 parts by weight of $ZrO_2$ were added per 100 parts by weight of a mixture comprised of 37% by weight of $(TiC+TiO_2)$ plus 63% by weight of $Al_2O_3$.

Figure 21:
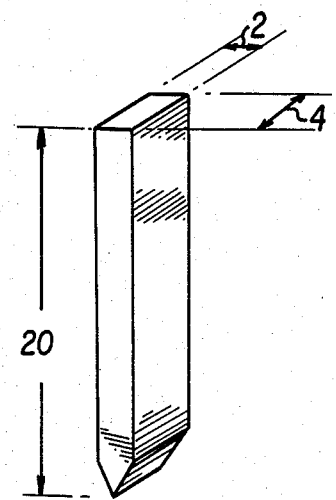
FIG. 21 illustrates the test pieces used in the third experiment III.
Figure 22:
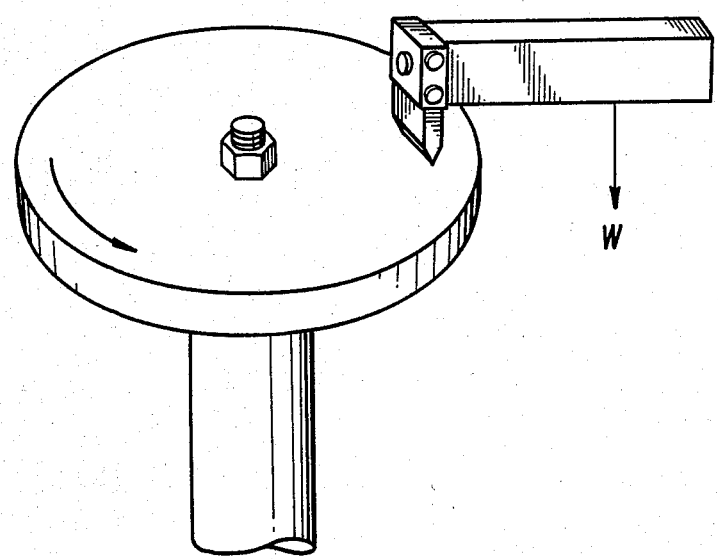
FIG. 22 illustrates the method of the third experiment III.

Subsequently, the sintered body was shaped by a resinoid-bonded diamond wheel and it is shown in FIG. 21. The method for wear test of pin-disk type compound with a ferrite disk formed to a size of 45-10$\times$10 mm is shown in FIG. 22. The amount of wear and the coefficient of friction were determined while the $Al_2O_3$-TiC ceramic was fixed and the disk was turned.

The test conditions were as follows:
Weight—0.95 kg
Friction velocity—1917 m/min.
The results of the tests are shown in Table 2.

TABLE 2

| specimen | coefficient of friction length of friction 0–960m | coefficient of friction length of friction 960–1000m | amount of wear (mm³) after 12000m |
| --- | --- | --- | --- |
| 37(TiC + TiO$_2$)-63Al$_2$O$_3$-0.25MgO | 0.43 | 0.38 | 0.047 |
| 37(TiC + TiO$_2$)-63Al$_2$O$_3$-0.5MgO | 0.41 | 0.35 | 0.188 |
| 37(TiC + TiO$_2$)-63Al$_2$O$_3$-1.0MgO | 0.41 | 0.33 | 0.190 |
| 37(TiC + TiO$_2$)-63Al$_2$O$_3$-2.5ZrO$_2$ | 0.30 | 0.35 | 0.138 |

(b) Evaluation

In the wear test, Y$_2$O$_3$ was held constant at 0.25 part by weight and MgO was varied, the test piece also containing 37 percent by weight of (TiC+TiO$_2$)+63 percent by weight of Al$_2$O$_3$, this amounting to 10 percent by weight of TiO$_2$/(TiC+TiO$_2$)×100. Amount of wear increases with the increase of MgO, but the coefficient of friction has a tendency to decrease. In the same manner, the coefficient of friction decreases with added ZrO$_2$. This small number for the coefficient of friction is one of the important, required characteristics as a substrate for magnetic head materials. Addition of the machineability agents is not only for improvement of grindability of the sintered body, but also for improvement of the substrate for a magnetic head slider. Furthermore, when a sintered body having a theoretical density of about 95% prepared by the hot pressing method was treated under the conditions of the above-mentioned HIP method, a sintered body of uniform and fine constituent grain or structure is obtained and it is suitable for the material of this invention.

The sintered bodies produced by the method of this embodiment have exhibited excellent performance properties, such as high hardness and high density when used as a substrate for magnetic head.

What we claim are:

1. A magnetic head slider comprising a substrate consisting essentially of:
    (a) 100 parts by weight, consisting of aluminum oxide and 30 to 50 parts by weight of (TiC+TiO$_2$), and provided that TiO$_2$/(TiC+TiO$_2$)×100=5 to 15%;
    (b) greater than one to 5 parts by weight of a machinability agent which is MgO, NiO, Cr$_2$O$_3$ or ZrO$_2$; and
    (c) 0.05 to 2 parts by weight of Y$_2$O$_3$.

2. A method of preparing a magnetic head slider comprising the following steps:
    (1) preparing a green compact by molding a raw material mixture which contains:
        (a) 100 parts by weight, consisting of aluminum oxide and 30 to 50 parts by weight of (TiC+TiO$_2$), and provided that TiO$_2$/(TiC+TiO$_2$)×100=5 to 15%;
        (b) 0.5 to 5 parts by weight of a machinability agent which is MgO, NiO, Cr$_2$O$_3$ or ZrO$_2$; and
        (c) 0.05 to 2 parts by weight of Y$_2$O$_3$;
    (2) presintering said green compact in a reducing or inert atmosphere to produce a presintered compact which has a density of more than 94 percent of the theoretical density;
    (3) subjecting said presintered body to hot isostatic pressing to effect sintering; and
    (4) machining the resulting sintered body to provide a substrate for the magnetic head slider.

3. A method of preparing a magnetic head slider comprising the following steps:
    (1) preparing a green compact by molding a raw mixture which contains:
        (a) 100 parts by weight, consisting of aluminum oxide and 30 to 50 parts by weight of (TiC+TiO$_2$), and provided that TiO$_2$/(TiC+TiO$_2$)×100=5 to 15%;
        (b) 0.5 to 5 parts by weight of a machinability agent which is MgO, NiO, Cr$_2$O$_3$ or ZrO$_2$; and
        (c) 0.05 to 2 parts by weight of Y$_2$O$_3$;
    (2) subjecting said green compact to a hot pressing to effect sintering; and
    (3) machining the resulting sintered body to provide a substrate for the magnetic head slider.

4. The method according to claim 2, wherein the TiC is of a slightly rounded shape prepared by low-temperature carbide-forming.

5. The method according to claim 2, wherein the amount of machinability agent is greater than one part by weight.

6. The method according to claim 2 wherein step (3) is effected in an inert gas atmosphere at about 1400° C. and under a pressure of at least about 1000 kg/cm².

7. The method according to claim 3 wherein step (2) is effected in an inactive atmosphere at 1350° C. to 1850° C. and under a pressure of at least about 200 kg/cm².

8. The method according to claim 3 wherein the TiC is of a slightly rounded shape prepared by low-temperature carbide-forming.

9. The method according to claim 3 wherein the amount of machinability agent is greater than one part by weight.

10. A magnetic head slider comprising a substrate having an improved machinability and being substantially pore-free, the substrate having been produced by the method of claim 5.

11. A magnetic head slider comprising a substrate having an improved machinability and being substantially pore-free, the substrate having been produced by the method of claim 9.

* * * * *